US006908656B2

(12) United States Patent
Daniel et al.

(10) Patent No.: US 6,908,656 B2
(45) Date of Patent: Jun. 21, 2005

(54) ORTHOGONALLY AMBIGUOUS CARPET TILE

(75) Inventors: Sydney D. Daniel, LaGrange, GA (US); David D. Oakey, LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 157 days.

(21) Appl. No.: 09/783,354

(22) Filed: Feb. 14, 2001

(65) Prior Publication Data

US 2002/0136855 A1 Sep. 26, 2002

(51) Int. Cl.[7] ............................ B32B 3/14; B32B 33/00

(52) U.S. Cl. ............................ 428/88; 428/89; 428/44; 428/48

(58) Field of Search ............................ 428/88, 89, 44, 428/48, 85, 49, 50, 51, 53; D06/582–594; D05/62; D25/157, 158–162, 136, 163

(56) References Cited

U.S. PATENT DOCUMENTS

| | | | | |
|---|---|---|---|---|
| 3,850,783 A | | 11/1974 | Peters et al. | |
| 3,875,716 A | | 4/1975 | Eusemann | |
| 5,011,411 A | | 4/1991 | Loewy | |
| 5,198,277 A | * | 3/1993 | Hamilton et al. | 428/92 |
| 6,203,879 B1 | * | 3/2001 | Desai | 428/88 |
| 6,526,704 B1 | | 3/2003 | Berard et al. | |
| 2002/0136855 A1 | | 9/2002 | Daniel et al. | |
| 2003/0116774 A1 | | 6/2003 | Tippett et al. | |

FOREIGN PATENT DOCUMENTS

| | | |
|---|---|---|
| BE | 890 436 A | 1/1982 |
| EP | 0 698 863 A | 2/1996 |
| GB | 1 537 727 A | 1/1979 |
| GB | 2 382 526 B | 2/2004 |

OTHER PUBLICATIONS

"Milstar Free–Lay Tiles," brochure by Milliken, admitted prior art.

* cited by examiner

*Primary Examiner*—Cheryl A. Juska
(74) *Attorney, Agent, or Firm*—Kilpatrick Stockton LLP; John S. Pratt; Kristin J. Doyle

(57) ABSTRACT

Carpet tiles having patterns and color schemes that obviate the need to orient the tiles relative to each other. The tiles exhibit orthogonal ambiguity, meaning that they may be laid in any side-by-side orientation with respect to adjacent tiles without looking out of place to the ordinary viewer and thereby still achieving an appearance of continuity like broadloom carpet. Each tile has patterns of shapes having some straight sides and that appear to be randomly positioned but oriented with some straight sides parallel to carpet tile sides. The shapes are formed from a color or combination of colors so that adjacent shapes on each tile have at least one color in common. Furthermore, each tile has at least one color in common with every other tile, so that when the tiles are laid, the colors on adjacent tiles coordinate. All of the colors have similar intensities so that no one color will significantly stand out from the other colors. Moreover, because the pattern on each tile appears random, placement of the tiles on the floor in any side-by-side orientation simply creates a larger, apparently random pattern, rendering it impossible for any tile to look out of place.

29 Claims, 4 Drawing Sheets

(4 of 4 Drawing Sheet(s) Filed in Color)

ORTHOGONALLY AMBIGUOUS CARPET TILE

FIELD OF THE INVENTION

This invention relates generally to carpet tiles and a method of designing carpet tiles having patterns and color schemes that allow for placement of the carpet tiles in any orientation with respect to adjacent carpet tiles while still achieving the appearance of broadloom carpet.

BACKGROUND OF THE INVENTION

Traditionally, proper placement of carpet tiles has been necessary to give the appearance of seamless broadloom carpet or at least the appearance of a carpet tile installation in which tiles are not out of place or misplaced. Conventional carpet tiles, particularly including tufted, fusion bonded, or woven face carpet tiles, normally have a "direction" as a result of (1) the pattern on the tiles and/or (2) the manufacturing process.

After the carpet web is cut into the tiles, the tiles must be oriented on the floor so that their pattern aligns with the patterns on adjacent tiles or with the appearance of adjacent tiles. Most carpet tiles are square. If a first carpet tile is placed on the floor, a second tile may be placed in four different positions relative to each side of the first tile by rotating the second tile in 90 degree increments relative to the first carpet tile and by placing the second tile adjacent to each of the four sides of the first tile. In only one of the second tile's four rotational positions is the second tile oriented in the same "direction" as the first tile, so that both tiles are in the same rotational orientation as they were relative to each other in the carpet web from which they were cut or as they came off of the carpet producing machine. Moreover, some patterns used on carpet tiles require that the second tile be placed only adjacent to a particular side or sides of the first tile, rather than adjacent to any of the four sides of the first tile.

Furthermore, because of the manufacturing process, even solid color tiles without any pattern usually have a nap orientation or "direction." Additionally, minor variations in color require that carpet tiles in a particular installation all use yarn dyed in the same dye lot to avoid visually discernable differences between adjacent carpet tiles resulting from variations in dying.

Therefore, not only must the patterns of adjacent tiles be aligned, adjacent tiles must be placed so that the nap is oriented in the same direction, and it is frequently necessary to insure that adjacent tiles, and sometimes all tiles in a particular installation, were dyed or have fiber dyed at the same time. If one carpet tile in an installation is oriented improperly with respect to adjacent carpet tiles, it is usually readily apparent that the tile has been misplaced, thereby destroying the appearance of continuity of pattern, nap, and color of the entire carpet tile installation. The carpet installer, therefore, must spend valuable time during installation ensuring proper orientation of the tiles.

SUMMARY OF THE INVENTION

This invention addresses the above-described problems by providing carpet tiles and a method of making carpet tiles having patterns and color schemes that obviate the need to orient the tiles (with respect to pattern or nap) relative to each other and that generally eliminate the need to match tiles as to dye lot. Instead, the tiles exhibit orthogonal ambiguity, meaning that tiles may be laid in any side-by-side orientation with respect to adjacent tiles without looking out of place to the ordinary viewer and thereby still achieving an appearance of continuity across the entire installation as if the tiles were part of a broadloom web.

"Orthogonally ambiguous" tiles must be positioned in one of sixteen positions relative to each other tile. Such positioning is achieved by rotating adjacent tiles in ninety degree increments relative to each other. A "rotational position indeterminate" carpet web pattern can be imaged in which any tile can be cut from the web in any rotational position relative to any other tile cut from the web, including a rotational position displaced by other than ninety degree increments (e.g. forty-five degrees). However, cutting tiles from a web at such orientations would generally produce substantial waste and be impractical.

The orthogonally ambiguous tiles of this invention are produced by first producing a carpet web having a pattern exhibiting the characteristics described herein and then cutting the web into tiles in the conventional ways that tiles are typically cut from a carpet web produced for that purpose. The web has a pattern of shapes having at least some straight edges that will parallel the tile edges but that appear to be randomly oriented and positioned within the pattern. The shapes are formed from a color or combination of colors so that adjacent shapes on each tile have at least one color in common. Furthermore, each tile always has at least one color in common with every other tile, so that when the tiles are laid, the colors on adjacent tiles coordinate. All of the colors typically should have similar intensities so that no one color significantly stands out from the other colors.

Because the pattern on each tile appears random, placement of the tiles on the floor in any orientation simply creates a larger, apparently random pattern, rendering it impossible for any tile to look out of place. Such randomness masks the visual effects of having adjacent carpet tiles with misaligned or differently-oriented naps and also masks slight color variations resulting from dye lot differences. The presence, within the pattern, of shapes with edges parallel to the edges of the tile insures that, if the shapes are partitioned when the web is cut into tiles, the partitioned shapes will not appear out of place, since the shapes of the pattern already include elements, having straight edges parallel to at least one of the tile edges, similar to the partitioned shapes, which have a straight edge defined by the straight edge of a panel. Given the apparent randomness of the pattern and color scheme, worn or soiled tiles in a particular installation may easily be replaced with an unused tile without the new tile looking as dramatically different from the remaining tiles as often results with tiles with conventional patterns.

It is thus an object of this invention to provide carpet tiles that may be laid in any orientation with respect to each other and still achieve the appearance of a continuous piece of broadloom carpet.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DETAILED DESCRIPTION OF THE DRAWINGS

Figure 1:
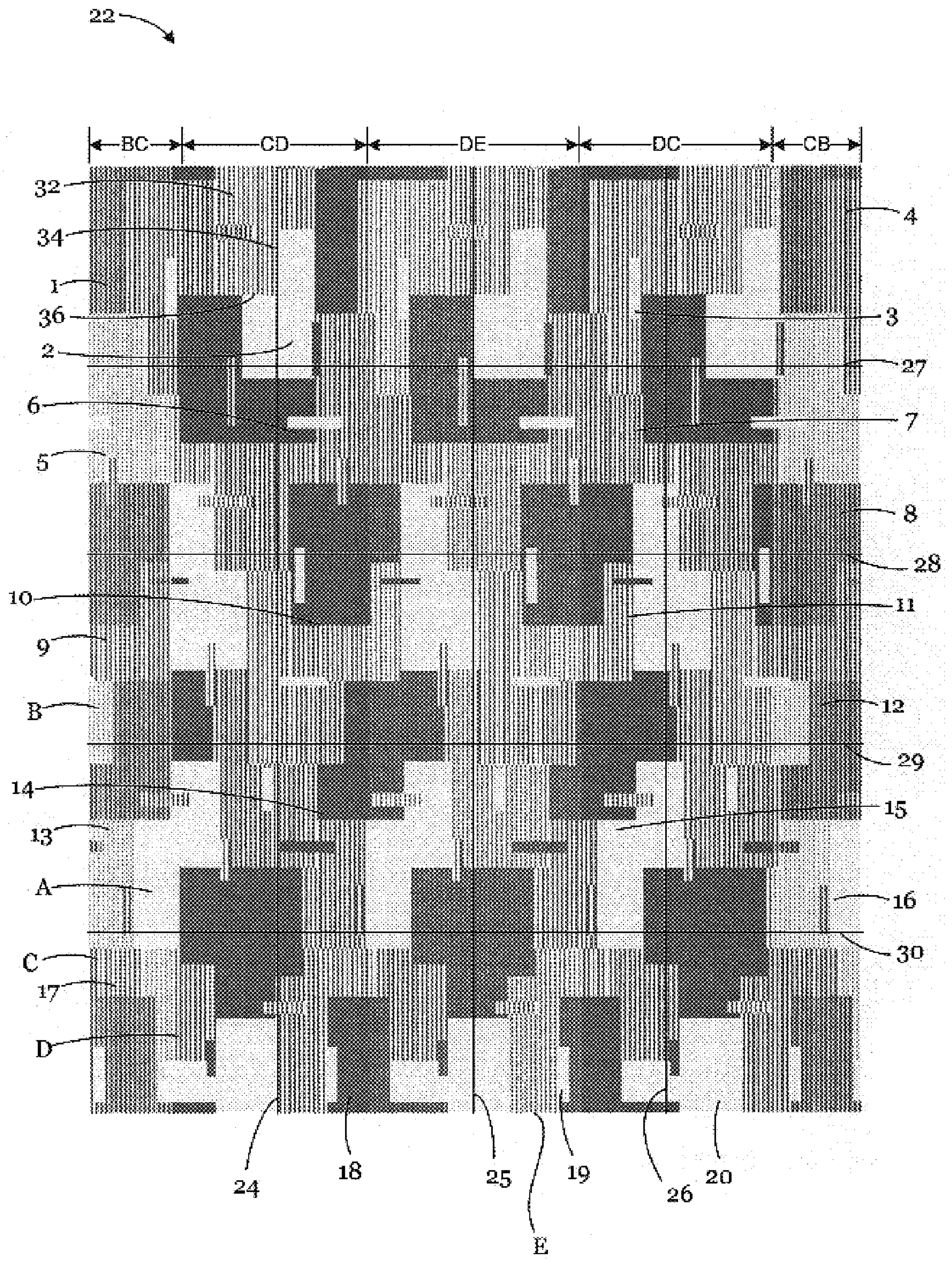
FIG. 1 is a top plan view of a carpet tile web produced in accordance with one embodiment of this invention.
Figure 2:
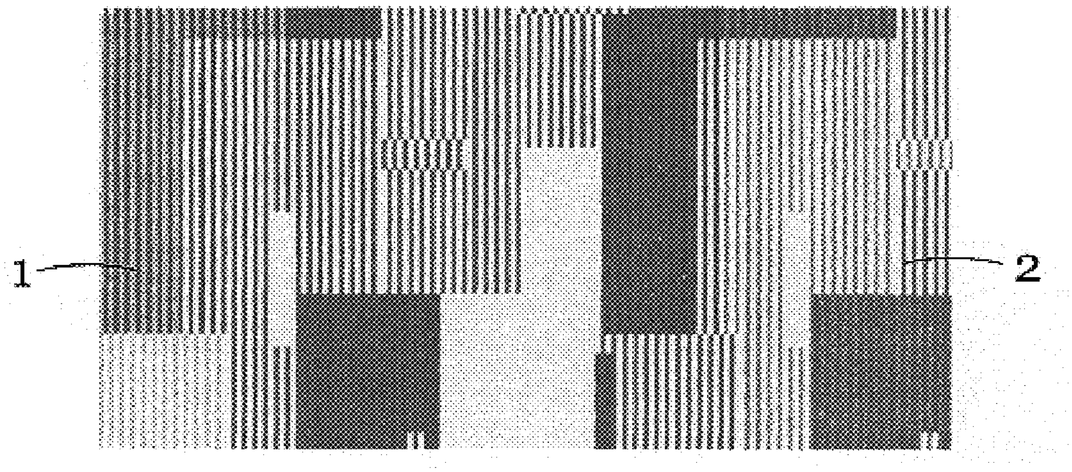
FIG. 2 is a top plan view of two carpet tiles produced in accordance with this invention positioned in a first orientation relative to each other.
Figure 3:
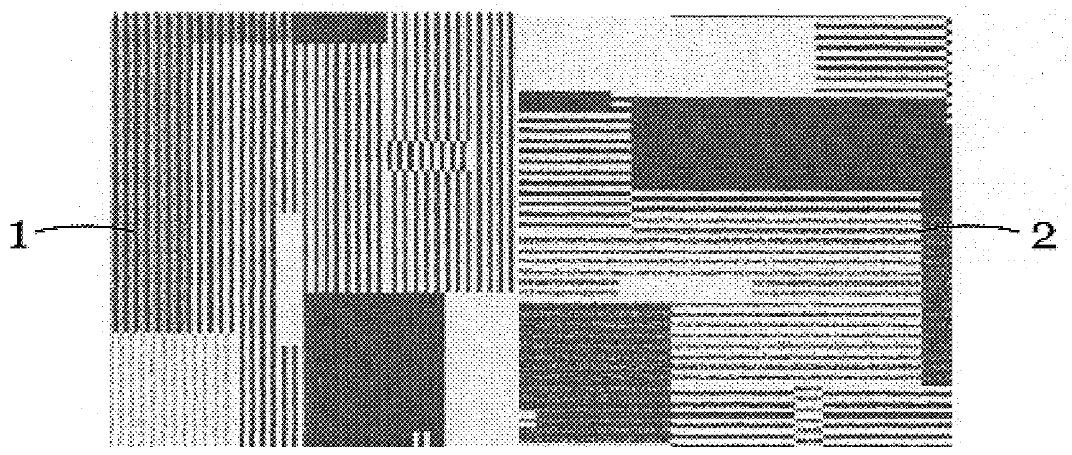
FIG. 3 is a top plan view of the two carpet tiles illustrated in FIG. 2 with one of the tiles rotated ninety degrees from the orientation illustrated in FIG. 2.
Figure 4:
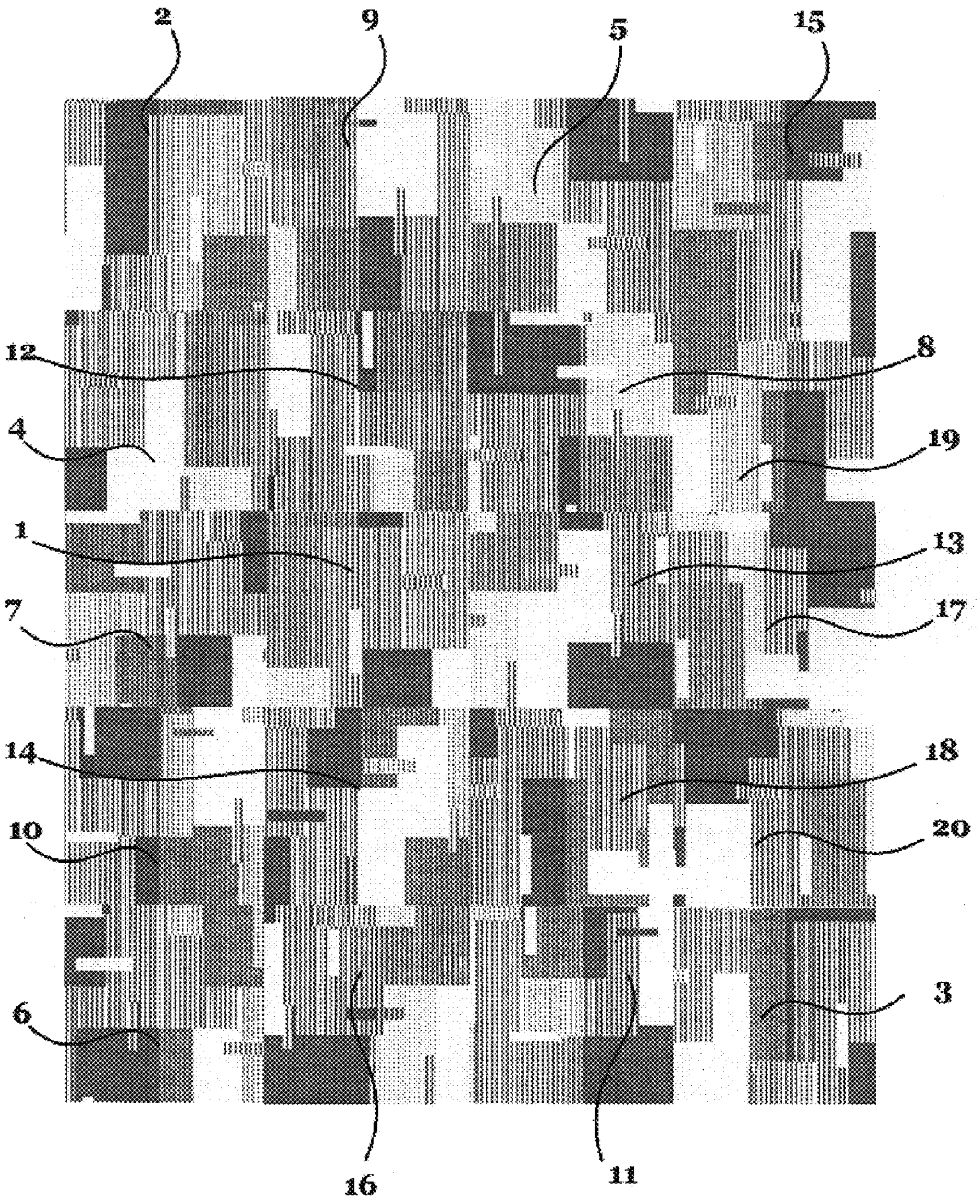
FIG. 4 is a top plan view of an assembly of carpet tiles cut from the web of FIG. 1.
Figure 5:
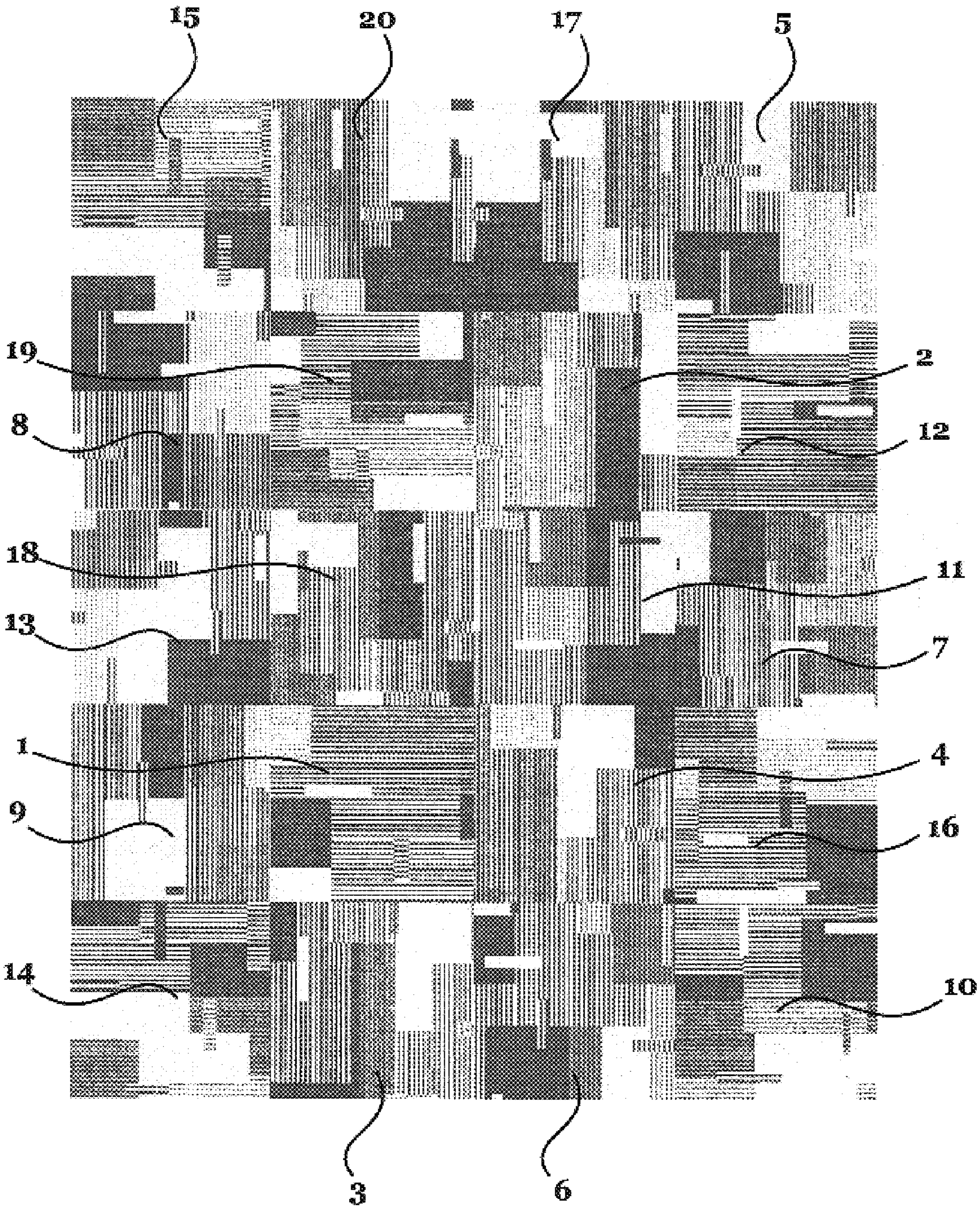
FIG. 5 is a top plan view of another assembly of the carpet tiles of FIG. 4.

FIG. 1 illustrates a carpet web 22 having a pattern consistent with this invention. Longitudinal partition lines 24–26 and horizontal partition lines 27–30 show how the web 22 may be partitioned into twenty individual carpet tiles 1–20. A number of factors contribute to the orthogonal ambiguity of each carpet tile, including pattern shapes and arrangement and shape colors.

The pattern produced on web 22 produces tiles with shapes that appear randomly positioned on the tile. Only shapes having certain characteristics are usable. First, at least some of the shapes must have straight sides parallel to the "machine" and "cross-machine" direction of the web 22, and therefore parallel to the tile edges. For instance, shape 32 in FIG. 1 has a straight side 34 parallel to longitudinal partition line 24 and therefore parallel to the edge of tile 1 that will be defined by longitudinal partition line 24. Similarly, shape 32 has a straight side 36 parallel to horizontal partition line 27, and it, too, will parallel the edge of tile 1 that will be defined by horizontal partition line 27. Partition line 24 will pass through and partition shape 32, thereby resulting in a portion of shape 32 that is a rectangle ending up on each of tile 1 and 2. The straight edge of shape 32 that will appear on each of tile 1 and 2 will not appear to be out of place.

Size of the shapes within the pattern is also important, as is lateral position of the shapes within the web. The shapes must generally be small enough so that several shapes will end up positioned within each tile. Otherwise, the fraction or fractions of larger shapes falling on a particular carpet tile would potentially look odd. Shapes should be positioned laterally within the web so that longitudinal partition lines 24, 25, and 26 do not partition a shape so that an oddly narrow portion falls on one of the tiles.

Each tile preferably has the same background color. At least one color, different from the background color, is used to form the shapes on the tile. Regardless of how many colors are used, all of the colors should have similar intensities so that no one color significantly stands out from the other colors. Note that multiple shapes may be, and preferably should be, formed on each tile. It is important, however, that each shape have at least one color in common with adjacent shapes on the tile. Use of multiple shapes and colors contributes to the apparent random quality of the pattern, thereby making an installation of such tiles appear to be continuous without regard to the orthogonal orientation of the tiles within the installation.

While the adjacent shapes of each tile have at least one color in common, additionally, each tile preferably has at least one color in common (in addition to the background color) with every other tile, so that when the tiles are laid, the colors on adjacent tiles will coordinate.

Because the pattern on each tile appears random, placement of the tiles on the floor in any orientation simply creates a larger, apparently random pattern, rendering it impossible for any tile to look out of place. Such apparent randomness obviates the need to align the nap or "direction" of adjacent tiles, as misaligned naps further enhance the random appearance of the carpeting. Such randomness also masks color variation resulting from dye lot differences.

In summary, the "rules" for creating a pattern in accordance with this invention are:

1. Utilization of a background color for the entire web from which tiles will be cut.
2. Utilization of a pattern of shapes on the web formed by colors of approximately the same intensity as the background color and each other.
3. Utilization of shapes small enough for several to appear on each tile.
4. Utilization of shapes having straight edges parallel to the tile edges.
5. Utilization of a pattern causing each tile cut from the web to have at least 1 color in common with each other tile.

The carpet web 22 shown in FIG. 1 practices these rules and may be formed by a conventional carpet tufting machine. For example, a tufting machine having two rows of needles may be used. One row of needles may be threaded up with a single background color that is present across the entire carpet web 22. The second row of needles may be threaded with yarns of other colors as described below. The pattern of shapes is created on the carpet web by controlling the height of the yarn. The farther the yarn is pushed through the primary backing, the greater its height in the finished carpet tile and the more predominant the color of the yarn is to the ordinary observer. In the pattern shown in FIG. 1, the background yarn A tufts have a uniform height across their entire pattern, so that at least some background yarn A is visible in all areas of the pattern, and some areas show only background yarn A.

For ease of manufacture, in the embodiment shown in FIG. 1 the color scheme of the carpet web 22 is symmetrical about the longitudinal partition line (and also longitudinal axis) 25 of the carpet web 22. This means that the two side-by-side tiles 1 and 2 on one side of a production line can be boxed together, while the two side-by-side tiles 3 and 4 on the other side of the production line can be boxed together, and all boxes will have the same proportions of tiles having a particular color combination. This symmetry would not be necessary if tiles from the entire line were used to fill all of the boxes or other packages of tiles produced together.

The background color A (in this instance, yellow) is tufted over the entirety of the carpet web 22. The patterns of the outer portions BC of the web 22 are further formed from alternating colors B and C (light green and dark green, respectively, in this embodiment). As explained above, the color of the yarn that is tufted with the greatest tuft height in the finished carpet tile is the more predominant color to the ordinary observer. Thus, creating patterns with colors B and C requires that the yarn be tufted so that the height of the yarn tufts of colors B and C varies with respect to each other. In other words, if a shape of color B is desired, then the yarn of color B is tufted to form yarn tufts that are higher than the surrounding yarn tufts formed by yarn of color C so that color B is more predominant than color C and thereby forms the pattern shape. Directly adjacent the outer portions BC, the patterns of middle portions CD are further formed from alternating colors C and D (dark green and blue, respectively, in this embodiment). Finally, the patterns of center portion DE are further formed from alternating colors D and E (blue and purple, respectively, in this embodiment).

While the carpet web 22 may be divided into any number of tiles, the carpet web 22 of FIG. 1 is divided into tiles 1–20 so that at least part of each tile has the color schemes of at least two of the portions—BC, CD, and DE. For example, outer portion BC and middle portion CD make up tile 1. In this embodiment, the shapes of tile 1 are made from: (1) the background color A only; (2) the background color A and color B only; (3) the background color A and color C only; (4) the background color A, color B, and color C; (5) the background color A and color D only; and (6) the background color A, color C, and color D. In this way, adjacent shapes of each tile have at least one common color.

Moreover, adjacent tiles have at least one color in common (in addition to the background color). For example, tile 1 and tile 2 have both color C and color D in common. When the tiles are placed on the floor, therefore, the colors on these adjacent tiles blend to facilitate the appearance of continuity.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims. For instance, different shapes and sizes of shapes than those illustrated can be used. Similarly, a wide variety of color combinations are possible. Furthermore, while the embodiment described above is tufted, the face fabric could also be woven on a conventional or computer controlled Jacquard or other loom, and the face fabric could be fusion bonded or formed in other manners. This invention could also be used for modular flooring or surface covering materials other than carpet tile, such as vinyl tile.

What is claimed is:

1. Carpet tiles comprising tile edges and textile faces, each face having a pattern comprising a plurality of shapes having shape edges, wherein:

a. at least some of the shapes comprise at least one shape edge that parallels at least one tile edge;

b. the pattern comprises at least a background color and a first color different from the background color and of similar intensity to the background color;

c. at least some adjacent shapes on each tile comprise at least one common color; and d. when the tiles are assembled on a flooring surface so that each tile is adjacent to and abuts at least one other tile, the tiles exhibit orthogonal ambiguity without pattern alignment between adjacent tiles.

2. The carpet tiles of claim 1, wherein the tiles have tufted faces.

3. The carpet tiles of claim 1, wherein the tiles have woven faces.

4. The carpet tiles of claim 1, wherein the tiles have fusion bonded faces.

5. The carpet tiles of claim 1, wherein at least one shape of the pattern comprises only the background color.

6. The carpet tiles of claim 1, wherein at least one shape of the pattern comprises the background color and the first color.

7. The carpet tiles of claim 1, wherein the pattern further comprises a second color different from the background color and the first color.

8. The carpet tiles of claim 7, wherein the background color, the first color, and the second color have similar intensities.

9. The carpet tiles of claim 7, wherein at least one shape of the pattern comprises only the background color and the second color.

10. The carpet tiles of claim 7, wherein at least one shape of the pattern comprises the background color, the first color, and the second color.

11. The carpet tiles of claim 7, wherein the pattern further comprises a third color different from the background color, the first color, and the second color.

12. The carpet tiles of claim 11, wherein the background color, the first color, the second color, and the third color have similar intensities.

13. The carpet tiles of claim 11, wherein at least one shape of the pattern comprises only the background color and the third color.

14. The carpet tiles of claim 11, wherein at least one shape of the pattern comprises only the background color, the second color, and the third color.

15. The carpet tiles of claim 1, wherein the tiles are square.

16. The carpet tiles of claim 1, wherein the pattern comprises at least one rectangular shape having shape edges parallel to a first pair of opposed edges of the tile on which the at least one rectangular shape appears and shape edges parallel to a second pair of opposed edges of the tile on which the at least one rectangular shape appears.

17. The carpet tiles of claim 1, wherein at least some of the shapes of the pattern on each tile are formed from at least one of a plurality of colors comprising at least the background color, the first color, and a second color, wherein at least one of the shapes on each tile is formed from the background color only, at least one of the shapes on each tile is formed from the background color and the first color only, at least one of the shapes on each tile is formed from the background color and the second color only, and at least one of the shapes on each tile is formed from the background color, the first color, and the second color, wherein the background color, the first color, and the second color have similar intensities.

18. Floorcovering comprising at least two carpet tiles of claim 1 positioned side-by-side.

19. Floorcovering comprising at least two carpet tiles of claim 1 positioned side-by-side wherein each tile pattern further comprises a second color different from the background color, wherein the background color and at least one of the first color and the second color are the same for the at least two carpet tiles.

20. A method of producing the floorcovering of claim 18 comprising forming carpet tiles having textile faces exhibiting orthogonal ambiguity and positioning the carpet tiles side-by-side on a flooring surface in any side-by-side or rotational orientation relative to each other.

21. A method of producing the carpet tiles of claim 1 comprising forming carpet tiles having an orthogonally ambiguous pattern that does not require pattern alignment between adjacent tiles.

22. The method of claim 21, wherein the carpet tiles are formed by designing a pattern for a carpet web, producing the carpet web with the pattern, and cutting the carpet web into the tiles.

23. The method of claim 22, wherein the pattern for the carpet web is designed by:

a. selecting a background color for the carpet web;

b. using a plurality of colors, including the background color, to form shapes on the carpet web; and c. designing and positioning the shapes on the carpet web so that at least one shape has at least one straight side parallel to an edge of the carpet web and adjacent shapes have at least one common color.

24. The method of claim 22, wherein the carpet web is produced using a tufting machine.

25. The method of claim 21, wherein the carpet tiles are formed by printing the pattern on the tiles.

26. Carpet tiles cut from a carpet web having a width and a length and comprising a textile face having a pattern comprising a plurality of shapes formed by a plurality of colors, wherein at least some adjacent shapes on the web comprise a common color and none of the shapes extends the full length or width of the web, wherein:

a. the carpet tiles cut from the web all comprise a common color and at least a portion of at least some of the plurality of shapes appear on each carpet tile cut from the web, each of which shapes having an edge that parallels at least one edge of the carpet tile on which it appears; and b. when the tiles are assembled on a flooring surface so that each tile is adjacent to and abuts at least one other tile, the tiles exhibit orthogonal ambiguity without alignment of shapes between adjacent tiles.

27. The carpet tiles of claim 26, wherein the tiles are square.

28. The carpet tile of claim 26, wherein at least some of the plurality of shapes appearing on each carpet tile comprise straight edges, and wherein at least one of the straight edges of each shape parallels a first pair of opposed edges of the carpet tile on which the shape appears and at least one of the straight edges of each shape parallels a second pair of opposed edges of the carpet tile on which the shape appears.

29. Floorcovering comprising a plurality of carpet tiles of claim 26 assembled on a flooring surface so that each tile is adjacent to and abuts at least one other tile.

* * * * *